(12) United States Patent
Paradise

(10) Patent No.: US 8,674,685 B2
(45) Date of Patent: Mar. 18, 2014

(54) MAGNETIC FLUX OIL LEVEL SENSOR FOR USE IN AIRCRAFT LUBRICATION SYSTEMS

(75) Inventor: Bruce Paradise, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1278 days.

(21) Appl. No.: 12/504,889

(22) Filed: Jul. 17, 2009

(65) Prior Publication Data

US 2011/0012592 A1 Jan. 20, 2011

(51) Int. Cl.
*G01B 7/14* (2006.01)

(52) U.S. Cl.
USPC .............. 324/207.16; 324/200; 324/233

(58) Field of Classification Search
None
See application file for complete search history.

(56) References Cited

U.S. PATENT DOCUMENTS

| | | | |
|---|---|---|---|
| 3,054,976 A | 9/1962 | Lipshutz | |
| 4,091,671 A | 5/1978 | McLees | |
| 4,215,574 A | 8/1980 | Godeux | |
| 4,771,804 A * | 9/1988 | Morales | 137/412 |
| 4,852,404 A | 8/1989 | Catanese | |
| 4,857,824 A | 8/1989 | Tew | |
| 5,003,258 A | 3/1991 | Mancini | |
| 5,089,930 A | 2/1992 | Chass | |
| 5,220,310 A | 6/1993 | Pye | |
| 5,617,023 A | 4/1997 | Skalski | |
| 6,192,753 B1 | 2/2001 | Czarnek | |
| 6,310,472 B1 | 10/2001 | Chass | |
| 6,876,194 B2 | 4/2005 | Lin et al. | |
| 7,021,139 B2 * | 4/2006 | Fukuhara et al. | 73/319 |
| 7,317,371 B1 | 1/2008 | Carroll | |
| 7,372,255 B2 * | 5/2008 | Holliday | 324/207.24 |
| 7,521,921 B2 | 4/2009 | Zhu et al. | |
| 8,260,736 B1 * | 9/2012 | Lear et al. | 706/46 |
| 8,302,473 B2 * | 11/2012 | Ramus et al. | 73/293 |
| 2001/0054312 A1 * | 12/2001 | Czarnek | 73/313 |

FOREIGN PATENT DOCUMENTS

JP 4043921 A 2/1992

OTHER PUBLICATIONS

Official Search Report and Written Report of the European Patent Office in counterpart foreign Appln. EP10251276.1, filed Feb. 13, 1992.

* cited by examiner

*Primary Examiner* — Jermele M Hollington
*Assistant Examiner* — Trung Nguyen
(74) *Attorney, Agent, or Firm* — Kinney & Lange, P.A.

(57) ABSTRACT

A magnetic flux position sensor includes a primary coil, a secondary coil, and a magnetic flux conductor. The primary coil generates a magnetic flux and the secondary coil senses magnetic flux. The primary and secondary coils are substantially concentric and spaced apart by an annular passage. The annular passage has first and second ends, and the magnetic flux conductor is slidable from the first end to the second end of the annular passage. The magnetic flux transferred from the primary coil to the secondary coil varies as a function of position of the magnetic flux conductor.

19 Claims, 2 Drawing Sheets

MAGNETIC FLUX OIL LEVEL SENSOR FOR USE IN AIRCRAFT LUBRICATION SYSTEMS

BACKGROUND

The present invention relates to measurement of liquid in fluid reservoirs, and more particularly, to measurement of lubricating oil in an oil reservoir of a gas turbine engine.

In many gas turbine engines, the amount of oil of an oil reservoir is measured using a floatable magnet near a reed switch array that includes a resistor ladder. Depending on the depth of oil, a particular reed switch will be closed by the magnet, sending current through the resistor ladder. The output of such a device is discrete with resolution limited by the spacing between and length of the reed switches. Alternatively, a linear variable differential transducer (LVDT) can provide an analog output and does not require a multitude of switches. However, LVDT's are typically large and bulky—at least two to three times taller than the measureable range of the device.

SUMMARY

According to the present invention, a magnetic flux position sensor includes a primary coil, a secondary coil, and a magnetic flux conductor. The primary coil generates a magnetic flux and the secondary coil senses magnetic flux. The primary and secondary coils are substantially concentric and spaced apart by an annular passage. The annular passage has first and second ends, and the magnetic flux conductor is slidable from the first end to the second end of the annular passage. The magnetic flux transferred from the primary coil to the secondary coil varies as a function of position of the magnetic flux conductor.

Another embodiment includes a method of measuring position. The method includes generating a magnetic flux with a primary coil and sensing magnetic flux conducted by a magnetic flux conductor from the primary coil to a secondary coil positioned substantially concentric with the primary coil. Magnitude of the magnetic flux sensed varies with position of the magnetic flux conductor along a path substantially parallel with a centerline of the primary and secondary coils.

The magnetic flux position sensor and the method of measuring position can be used to measure a level of liquid (such as lubricating oil) in a reservoir (such as an oil reservoir of a gas turbine engine). This can be done by floating the magnetic flux conductor in the liquid while sensing magnetic flux that it conducts.

DETAILED DESCRIPTION

Figure 1:
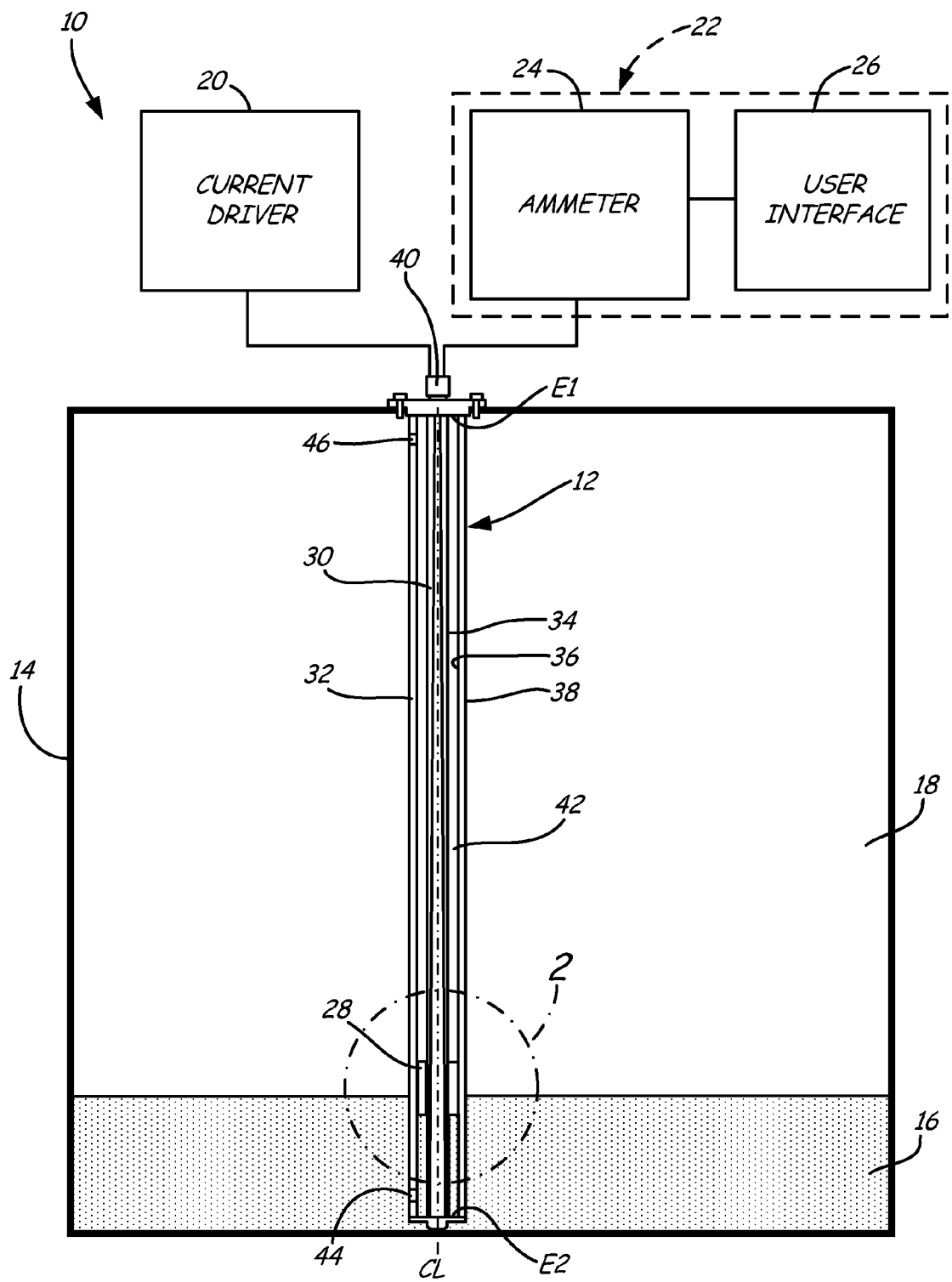
FIG. 1 is a front elevation view showing an fluid reservoir assembly with a liquid level sensor in cross-section according to the present invention.

In FIG. 1, fluid reservoir assembly 10 is shown with liquid level sensor 12 in cross-section view. Fluid reservoir assembly 10 includes fluid reservoir 14 (having liquid 16 and air 18 contained therein), liquid level sensor 12, current driver 20, and output circuitry 22 (having ammeter 24 and user interface 26).

Liquid level sensor 12 is positioned inside fluid reservoir 14 and includes flux conductor 28, primary coil 30, secondary coil 32, primary coil housing 34, inner secondary coil housing 36, outer secondary coil housing 38, and connector 40. In the illustrated embodiment, flux conductor 28 is located between primary coil 30 and secondary coil 32. Secondary coil 32 surrounds both flux conductor 28 and primary coil 30, and flux conductor 28 surrounds primary coil 30. Flux conductor 28, primary coil 30, and secondary coil 32 are substantially concentric about centerline $C_L$. Primary coil 30 is spaced from secondary coil 32 by annular passage 42. Annular passage 42 has first end E1 near a top of liquid level sensor 12 and second end E2 near a bottom of liquid level sensor 12. While the position of primary coil 30 is substantially fixed with respect to secondary coil 32, flux conductor 28 is slidable along annular passage 42 from first end E1 to second end E2. The path of flux conductor 28 from first end E1 to second end E2 of annular passage 42 is substantially parallel with centerline $C_L$.

Lower vent 44 and upper vent 46 are ports that pass through secondary coil 32, inner secondary coil housing 36, and outer secondary coil housing 38. Thereby, annular passage 42 is fluidly connected with liquid 16 and air 18 via lower vent 44 and upper vent 46. As the volume of liquid 16 varies in fluid reservoir 14, liquid 16 generally flows in and out of annular passage 42 via lower vent 44. Air 18 generally flows in and out of annular passage 42 via upper vent 46, filling space in annular passage 42 not occupied by liquid 16. Thereby, the level of liquid 16 in annular passage 42 varies with the volume of liquid 16 in fluid reservoir 14. Because flux conductor 28 is buoyant in liquid 16, flux conductor 28 rises and falls substantially in accordance with the level of liquid 16 in annular passage 42.

Primary coil 30 is made of electrically conductive wire material that is coiled inside of primary coil housing 34. In one embodiment, primary coil 30 is wound with a non-uniform cross-section, such that the number of turns in the wire varies along the length of primary coil 30. In another embodiment, primary coil 30 is substantially continuously tapered such that the number of turns of the wire decreases along the length of annular passage 42 from first end E1 to second end E2. In the illustrated embodiment, primary coil 30 is tapered at a constant rate such that the number of turns of the wire constantly decreases in a linear fashion along the length of annular passage 42 from first end E1 to second end E2. By decreasing the number of turns in primary coil 30, inductance of primary coil 30 can decrease substantially continuously between first end E1 and second end E2. Secondary coil 32 is made of an electrically conductive wire material that is wrapped around inner secondary coil housing 36 but is surrounded by outer secondary coil housing 38. Such construction allows primary coil 30 and secondary coil 32 to act as electrical inductors.

Primary coil 30 is electrically connected to current driver 20, and secondary coil 32 is electrically connected to output circuitry 22. The connections made between primary coil 30 and current driver 20 and between secondary coil 32 and output circuitry 22 can be run through connector 40. In alternative embodiments, current driver 20 and/or output circuitry 22 can be located inside fluid reservoir 14. In those embodiments, the electrical connections can be internal to fluid reservoir 14.

Liquid level sensor 12 operates when current driver 20 provides a controllable electrical alternating current and voltage to primary coil 30, generating an alternating magnetic field, and corresponding magnetic flux, around primary coil 30. Flux conductor 28 then links the magnetic flux from primary coil 30 to secondary coil 32. The magnetic flux can be sensed because changes in magnetic flux induce an electrical output, such as a current or a voltage, in secondary coil 32. The output of secondary coil 32 is transmitted to output circuitry 22, which includes ammeter 24 and user interface 26. Ammeter 24 senses and measures the magnitude of the current. In an alternative embodiment, a voltmeter (not shown) can be placed in substantially the same position as ammeter 24 and can be used to sense and measure voltage across secondary coil 32. User interface 26 displays a useful representation of the data collected and processed by output circuitry 22, such as the level or volume of liquid 16 in fluid reservoir 14. In one embodiment, output circuitry 22 can supply an analog output to user interface 26 and need not perform digital signal processing. User interface 26 can be positioned, for example, in a cockpit of an aircraft (not shown) for use by a pilot monitoring fluid conditions.

Because primary coil 30 is tapered, the magnetic flux created by primary coil 30 varies in magnitude from one end (near first end E1) of primary coil 30 to the other end (near second end E2). Therefore, by sliding flux conductor 28 to different positions along annular passage 42, flux conductor 28 affects the magnitude of the magnetic flux sensed by secondary coil 32 by linking a different magnitude of magnetic flux to secondary coil 32. Thereby, the magnitude of the current or voltage induced in or across secondary coil 32 and measured by output circuitry 22 varies as a function of position of flux conductor 28 along annular passage 42. In one embodiment, the relationship between the magnitude of the output of secondary coil 32 and the position of flux conductor 28 is linear. In an alternative embodiment, the relationship can be proportional, though non-linear.

In one embodiment, liquid 16 can be a lubricating oil for use in gas turbine engines (not shown), and flux conductor 28 is buoyant in that lubricating oil. Therefore, the position of flux conductor 28 substantially represents the level of liquid 16 in fluid reservoir 14. Because the magnitude of the current measured by output circuitry 22 is affected by the position of flux conductor 28, the magnitude of the current measured by output circuitry 22 is related to the level of liquid 16 in fluid reservoir 14. Therefore, output circuitry 22 can perform a measurement algorithm that relates the magnitude of current sensed by ammeter 24 to the level of liquid 16 in fluid reservoir 14. In addition, because the level of liquid 16 is related to the volume of liquid 16 in fluid reservoir 14, the position of flux conductor 28 is also related to the volume of liquid 16 in fluid reservoir 14. Therefore, output circuitry 22 can also apply another measurement algorithm to relate the magnitude of current sensed by ammeter 24 to the volume of liquid 16 in fluid reservoir 14. In another embodiment, output circuitry 22 can perform a measurement algorithm that relate the magnitude of the voltage across primary coil 30 with the voltage induced across secondary coil 32. More specifically, the measurement algorithms can include a transformation ratio of secondary coil 32 voltage to primary coil 30 voltage. The transformation ration would be a number between 0 and 1, which the measurement algorithm can relate to the level of liquid 16 and/or to the volume of liquid 16 in fluid reservoir 14.

The temperature of liquid 16 can influence the relationship between the magnitude of the current measured by output circuitry 22 and the volume of liquid 16 in fluid reservoir 14. This occurs because liquid 16 transfers heat to flux conductor 28, primary coil 30, and secondary coil 32. One way in which the temperature of liquid 16 can affect liquid level sensor 12 is due to the resistance of primary coil 30 and secondary coil 32 varying with temperature. This effect can be compensated for by controlling current driver 20 to supply an alternating current of known frequency and amplitude. In one embodiment, current driver 20 can be a constant current driver for keeping frequency and amplitude of the alternating current substantially constant through varying temperatures.

The magnetic permeability of flux conductor 28 also varies with temperature. This causes the amount of magnetic flux conducted from primary coil 30 to secondary coil 32 to vary with temperature, thus varying the current induced in secondary coil 32 and the magnitude of current measured by output circuitry 22. This effect can be compensated for by using a flux compensation factor in the measurement algorithms of output circuitry 22.

The density of liquid 16 varies with temperature as well. This can cause flux conductor 28 to float higher or lower in liquid 16, thus affecting the position of flux conductor 28 with respect to the surface level of liquid 16. Varying the position of flux conductor 28 with respect to the surface level of liquid 16 can change the relationship between the magnitude of the current measured by output circuitry 22 and the level and volume of liquid 16 in fluid reservoir 14. This effect can be compensated for by using a density compensation factor in the measurement algorithms of output circuitry 22.

A temperature sensor (not shown) can monitor the temperature of liquid 16 and provide temperature data to output circuitry 22 for use in compensation. Thus, liquid level sensor 12 can be calibrated to compensate for temperature dependent changes in the resistance of the wire in primary coil 30 and secondary coil 32, the magnetic permeability of flux conductor 28, and the density of liquid 16. In such a system, the measured level and volume of liquid in fluid reservoir 16 can be substantially independent of the temperature of liquid 16.

During operation of liquid level sensor 12, liquid 16 can be disturbed due to the agitation of fluid reservoir 14, such as during aircraft turbulence. Such a situation would cause the surface of liquid 16 to move while the volume of liquid 16 in fluid reservoir 14 remains substantially the same. Lower vent 44 can dampen the effect of such disturbances on the level of liquid 16 in annular passage 42. In one embodiment, lower vent 44 can dampen disturbances by being relatively small in diameter. In another embodiment, disturbances can be dampened by having at least one baffle inside or near lower vent 44. In both embodiments the flow of liquid 16 through annular passage 42 would be restricted, reducing the speed at which the level of liquid 16 changes within annular passage 42. Thereby, the level of liquid 16 in annular passage 42 can change due to variation of the volume of liquid 16 in fluid reservoir 14, but the turbulent changes in the level of liquid 16 in annular passage 42 would be substantially dampened.

Figure 2:
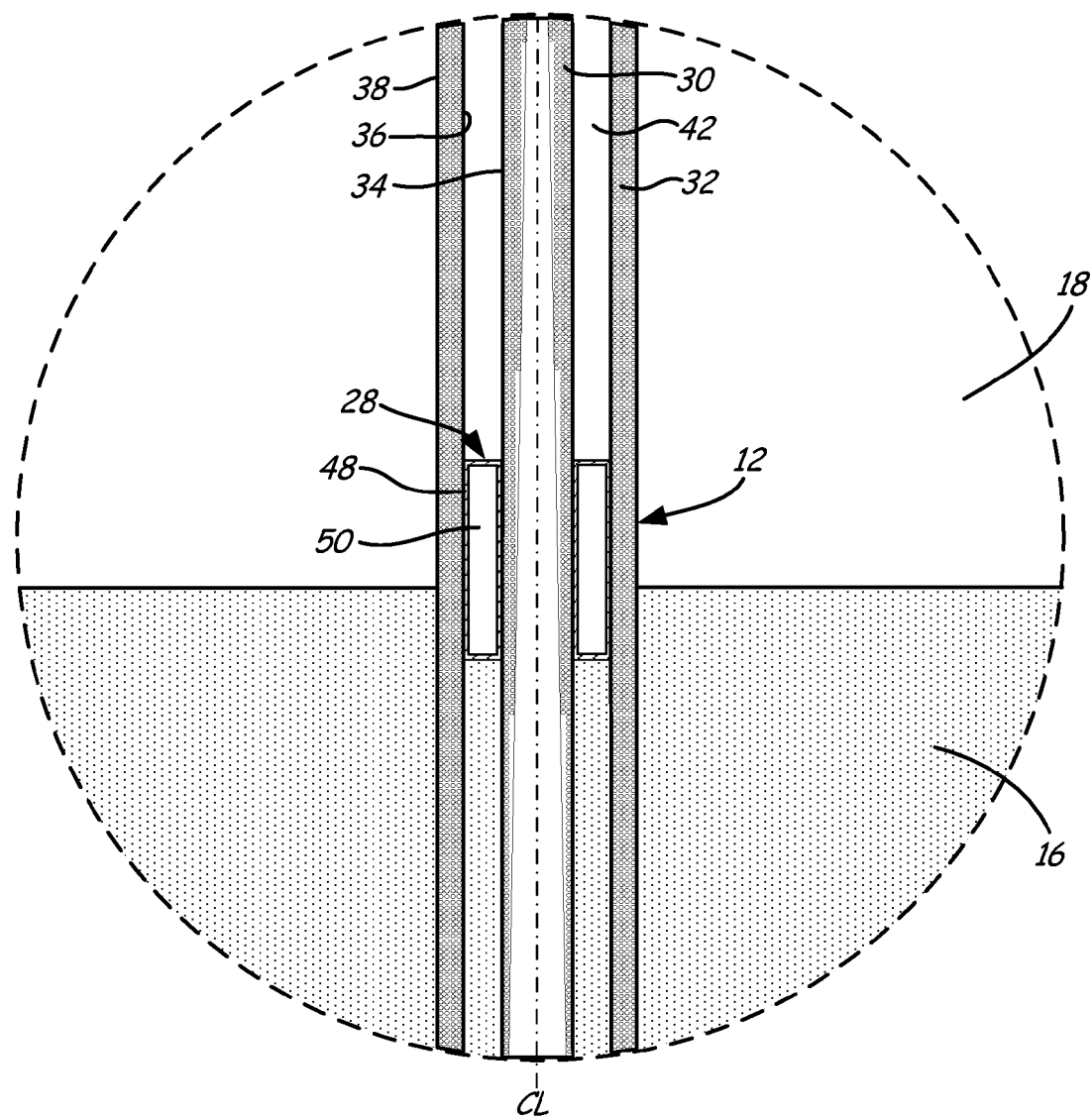
FIG. 2 is an enlarged view taken from section 2 in FIG. 1 of the liquid level sensor in cross-section according to the present invention.

FIG. 2 is a side sectional view of liquid level sensor 12. In the illustrated embodiment flux conductor 28 is a hollow toroid of rectangular cross-section with shell 48 defining cavity 50. Cavity 50 allows flux conductor 28 to float in liquid 16 despite shell 48 being made from a material of higher specific gravity than liquid 16. In other embodiments, flux conductor 28 can be annular with a cross section that is circular or another suitable shape. Because flux conductor 28 is located between primary coil 30 and secondary coil 32, flux conductor 28 conducts a relatively large amount of magnetic flux from primary coil 30 to secondary coil 32. Also, the annular shape of flux conductor 28 allows it to surround primary coil 30, which provides a greater surface area for conducting conducts a relatively large amount of magnetic flux. Because flux conductor 28 conducts magnetic flux so efficiently, liquid level sensor 12 can operate using a relatively small amount of electricity from current driver 20.

Shell 48 includes a material that has a sufficiently high magnetic permeability, such that flux conductor 28 can conduct magnetic flux. Suitable materials include ferrous metals such as nickel-iron alloy. In an alternative embodiment, flux conductor 28 can be fabricated out of two materials: one material that conducts magnetic flux, such as a nickel-iron alloy, and another material that is buoyant in liquid 16. In such an embodiment, the portion of flux conductor 28 that conducts flux would not need to have cavity 50.

In contrast, primary coil housing 34, inner secondary coil housing 36, and outer secondary coil housing 38 comprise a material that has a relatively low magnetic permeability. Having a relatively low magnetic permeability allows these housings to have a relatively small effect on the conduction of magnetic flux from primary coil 30 to secondary coil 32, as such housings do not conduct substantial amounts of magnetic flux. This increases the sensitivity of liquid level sensor 12 by allowing flux conductor 28 to conduct a greater amount of the total flux conducted from primary coil 30 to secondary coil 32. Suitable materials for constructing primary coil housing 34, inner secondary coil housing 36, and outer secondary coil housing 38 can include materials such as some stainless steel alloys, aluminum alloys, and polymers.

In the illustrated embodiment, primary coil 30 is substantially continuously tapered along its length such that the number of turns of the wire is greater at one end of primary coil 30 than at the other end. The taper occurs in the inside of primary coil 30 such that primary coil 30 is substantially frusto-conical along its interior and substantially cylindrical along its exterior. Secondary coil 32 is substantially cylindrical along its interior and exterior. Primary coil housing 34, inner secondary coil housing 36, and outer secondary coil housing 38 are also substantially cylindrical and concentric. Thus, annular passage 42 is substantially cylindrical and of uniform radial thickness along its length. In another embodiment, secondary coil 32 can be tapered.

It should be recognized that the present invention provides numerous benefits and advantages. For example, the present invention can provide improved resolution, accurate within about 0.125 inches (0.3175 centimeters) or better. Due to the tapered contour of primary coil 30, the resolution can be substantially infinite. Such resolution allows for accurate analysis of the level and volume of liquid 16 in fluid reservoir 14. Compensating for variable temperature further improves accuracy. Such accuracy can be beneficial continuously throughout an aircraft flight. Also, liquid level sensor 12 has a relatively large measurable range available. Thereby, the amount of space that liquid level sensor 12 uses in fluid reservoir 14 is relatively small, while the range of levels of liquid 16 that can be measured by liquid level sensor 12 is relatively large. For example, liquid level sensor 12 can have a measurable range of about 30 inches (76.2 centimeters) while having a total length that is only slightly longer. Additionally, the concentric configuration of flux conductor 28, primary coil 30, and secondary coil 32 provides for other benefits and advantages. Liquid level sensor 12 can operate using a relatively small amount of electrical power because flux conductor 28 is located between primary coil 30 and secondary coil 32. The annular shape of flux conductor 28 allows for a large flux conducting surface area, which further reduces the amount of electrical power required to operate liquid level sensor 12. Low power operation not only saves energy, but it is also safer for use in an environment where flammable materials are present, such as lubricating oil. Moreover, liquid level sensor 12 has relatively few moving parts, which enhances reliability.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims. For example, primary coil 30 and secondary coil 32 could exchange positions, such that primary coil 30 surrounds both flux conductor 28 and secondary coil 32, and flux conductor 28 surrounds secondary coil 32. Additionally, liquid level sensor 12 need not be limited for use in measuring lubricating oil in a gas turbine engine. Rather, it can be used in virtually any application that benefits from its design.

The invention claimed is:

1. A magnetic flux position sensor comprising:
a primary coil for generating a magnetic flux;
a secondary coil for sensing magnetic flux, wherein the primary and secondary coils are substantially concentric, wherein the primary coil is spaced from the secondary coil by an annular passage having a first end and a second end, and wherein a characteristic of at least one of the primary and secondary coils decreases substantially continuously between the first end and the second end;
a magnetic flux conductor positioned in the annular passage so as to be slidable from the first end to the second end for conducting magnetic flux from the primary coil to the secondary coil, wherein magnetic flux transferred from the primary coil to the secondary coil varies as a function of position of the magnetic flux conductor;
a current driver electrically connected to the primary coil; and
output circuitry connected to the secondary coil for producing an output that is a function of position of the magnetic flux conductor along the annular passage, the output circuitry including an ammeter for sensing current in the secondary coil and a measurement algorithm that relates magnitude of current sensed in the secondary coil to the level of liquid in the reservoir.

2. The magnetic flux position sensor of claim 1, wherein the characteristic is inductance, which decreases due to a decreasing number of coil turns.

3. The magnetic flux position sensor of claim 1, and further comprising:
a reservoir for holding a liquid, wherein the magnetic flux position sensor is positioned inside the reservoir for sensing a level of liquid in the reservoir.

4. The magnetic flux position sensor of claim 1, wherein the measurement algorithm in the output circuitry compensates for temperature influences on magnetic permeability and liquid density.

5. The magnetic flux position sensor of claim 1, wherein the current driver produces a controllable electrical alternating current.

6. The magnetic flux position sensor of claim 1, wherein a current induced in the secondary coil is substantially linearly related to position of the magnetic flux conductor.

7. The magnetic flux position sensor of claim 1, wherein the magnetic flux conductor includes ferrous material.

8. The magnetic flux position sensor of claim 1, wherein the magnetic flux conductor is buoyant in a lubricating oil.

9. The magnetic flux position sensor of claim 1, wherein the magnetic flux conductor is annular.

10. A magnetic flux position sensor comprising:
a primary coil for generating a magnetic flux;
a secondary coil that is substantially concentric with the primary coil for sensing magnetic flux, wherein the primary coil is spaced from the secondary coil by an annular passage having a first end and a second end;
a magnetic flux conductor slidable from the first end to the second end of the annular passage, wherein magnetic flux transferred from the primary coil to the secondary coil varies as a function of position of the magnetic flux conductor; and
output circuitry comprising an ammeter for sensing current in the secondary coil and a measurement algorithm that relates magnitude of current sensed in the secondary coil to the level of liquid in the reservoir.

11. The magnetic flux position sensor of claim 10, wherein the magnetic flux conductor is substantially toroidal.

12. The magnetic flux position sensor of claim 10, wherein the primary coil has a non-uniform cross-section.

13. The magnetic flux position sensor of claim 10, wherein the primary coil is tapered.

14. The magnetic flux position sensor of claim 10, wherein the primary coil is tapered at a constant rate from the first end to the second end.

15. A method of measuring position, the method comprising:
generating a magnetic flux with a primary coil electrically connected to a current driver;
sensing magnetic flux conducted by a magnetic flux conductor from the primary coil to a secondary coil, wherein the primary coil substantially concentric with the secondary coil and separated from the secondary coil by an annular passage, wherein the magnetic flux conductor is slidable from the first end to the second end of the annular passage, and wherein magnitude of the magnetic flux sensed varies with position of the magnetic flux conductor along a path substantially parallel with a centerline of the primary and secondary coils; and
producing an output that is a function of position of the magnetic flux conductor along the path in an annular passage via output circuitry connected to the secondary coil, via output circuitry comprising an ammeter for sensing current in the secondary coil and a measurement algorithm that relates magnitude of current sensed in the secondary coil to the level of liquid in the reservoir.

16. The method of claim 15, and further comprising:
providing a controllable electrical alternating current to the primary coil via the current driver to generate the magnetic flux.

17. The method of claim 15, and further comprising:
floating the magnetic flux conductor in liquid.

18. The method of claim 17, and further comprising:
calculating level of the liquid as a function of the magnetic flux sensed in the secondary coil.

19. The method of claim 17, and further comprising:
providing the output as an analog output representing the level of the liquid in the reservoir.

* * * * *